US009925938B2

(12) United States Patent
Sanfilippo et al.

(10) Patent No.: US 9,925,938 B2
(45) Date of Patent: Mar. 27, 2018

(54) GRILLE INSERT FOR PROTECTING MOTOR VEHICLE RADIATOR

(71) Applicant: UNDERTHESUNINSERTS, LLC, E. Patchogue, NY (US)

(72) Inventors: Joseph Sanfilippo, Bellport, NY (US); Jamie Thomas, E. Patchogue, NY (US)

(73) Assignee: UNDERTHESUNINSERTS, LLC, East Patchogue, NY (US)

( * ) Notice: Subject to any disclaimer, the term of this patent is extended or adjusted under 35 U.S.C. 154(b) by 0 days.

(21) Appl. No.: 15/340,946

(22) Filed: Nov. 1, 2016

(65) Prior Publication Data

US 2017/0210321 A1 Jul. 27, 2017

Related U.S. Application Data

(60) Provisional application No. 62/249,315, filed on Nov. 1, 2015.

(51) Int. Cl.
*B60R 19/52* (2006.01)
*B60K 11/04* (2006.01)
*B60K 13/02* (2006.01)
*F01P 11/12* (2006.01)
*B60K 11/08* (2006.01)

(52) U.S. Cl.
CPC .............. *B60R 19/52* (2013.01); *B60K 11/04* (2013.01); *B60K 11/08* (2013.01); *B60K 13/02* (2013.01); *B60R 2019/525* (2013.01); *F01P 11/12* (2013.01)

(58) Field of Classification Search
CPC ........ B60R 2019/522; B60R 2019/525; B60R 19/52; B60K 11/04; B60K 11/08
See application file for complete search history.

(56) References Cited

U.S. PATENT DOCUMENTS

2011/0204680 A1\* 8/2011 Fortin ..................... B60R 19/18
296/193.1

\* cited by examiner

*Primary Examiner* — Erez Gurari

(57) ABSTRACT

Metallic grille inserts and methods for installing metallic grille inserts are disclosed, which are configured to protect air-cooled radiators of motor vehicles. The metallic grille inserts can be installed and disposed between an air-cooled radiator and front-end grille of an automobile without the need for drilling or using screws, bolts, or mounting frames to fixedly secure the metallic grille insert in place.

12 Claims, 10 Drawing Sheets

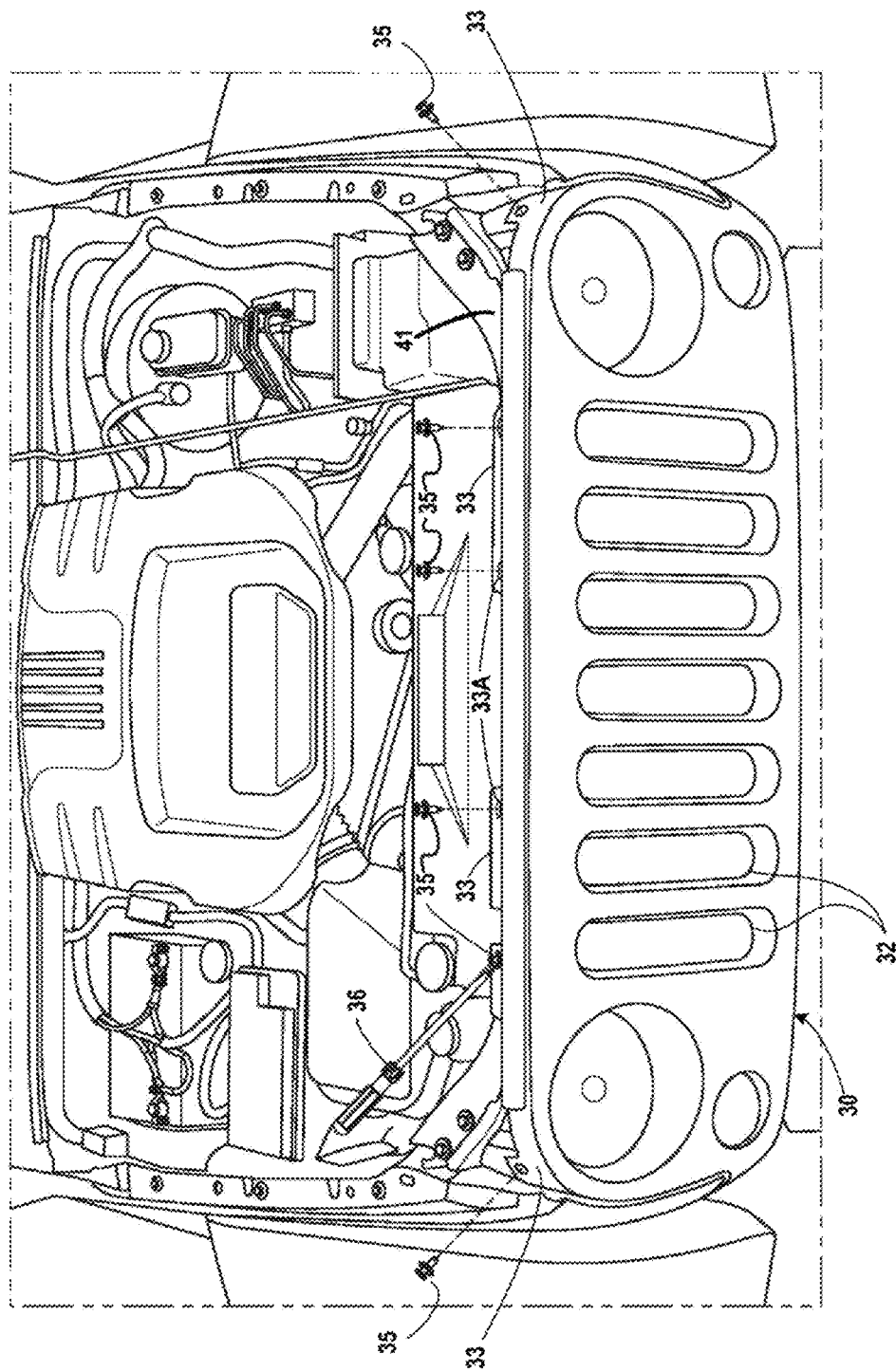

GRILLE INSERT FOR PROTECTING MOTOR VEHICLE RADIATOR

CROSS-REFERENCE TO RELATED APPLICATION

This application claims priority to Provisional Application Ser. No. 62/249,315 filed on Nov. 1, 2015, which is incorporated herein by reference.

TECHNICAL FIELD

The field relates generally to devices and methods for protecting air-cooled radiators of motor vehicles.

BACKGROUND

In general, motor vehicles such as cars, SUVs and Jeeps have front-end grilles that serve various functions. For example, a front-end grille is configured to cover a front-end opening in the body of an automobile where an air-cooled radiator is disposed, while having some form of grating configuration that allows air to pass through the grille and enter into the engine compartment and flow towards the air-cooled radiator. While front-end grilles provide some form of protection to the air-cooled radiator and engine from debris, such front-end grilles are designed to provide a fanciful ornamental design, wherein the grating may be insufficient to prevent certain types of debris from impacting the air-cooled, radiator while driving the vehicle. For example, front-end grilles typically have grating configurations that allow insects and other small debris such as pebbles and sand, for example, to pass through the grille and impact the air-cooled radiator. Over time, such impact can clog, or otherwise damage, the air-cooled radiator, which can result in a decrease in the airflow through the radiator, and thus, decrease the cooling functionality of the radiator.

SUMMARY

Embodiments of the invention generally include grille inserts and methods for installing grille inserts which are configured to protect air-cooled radiators of motor vehicles. For example, one embodiment of the invention includes a grille insert. The grille insert comprises a sheet of metallic material having a pattern of perforations. In one embodiment, the sheet of metallic material comprises aluminum. In one embodiment, the pattern of perforations comprises a pattern of holes, wherein the holes have a diameter of at least ⅛ inch. In one embodiment, the sheet of metallic material comprises a thickness in a range of about 0.050 of an inch to about 0.080 of an inch. In yet another embodiment of the invention, the grille insert comprises an ornamental print formed on at least one surface of the grille insert.

Another embodiment of the invention includes a method for installing a grille insert. The method includes: disconnecting an upper portion of a front-end grille from a front-end frame structure of a motor vehicle; pulling the upper portion of the front-end grille away from the front-end frame structure of the motor vehicle; slidably inserting a metallic grille insert between the front-end grille and the front-end frame structure of the motor vehicle; and reconnecting the upper portion of the front-end grille to the front-end frame structure of the motor vehicle such that the metallic grille insert is squeezably held in position between the front-end grille and the front-end frame structure of the motor vehicle.

In another embodiment, the metallic grille insert comprises an ornamental print formed, on at least one surface of the grille insert, wherein the metallic grille insert is installed so that the ornamental print is viewable through a grating structure of the front-end grille of the motor vehicle.

Other embodiments of the invention will be described in the following detailed description of embodiments, which is to be read in conjunction with the accompanying figures.

BRIEF DESCRIPTION OF THE DRAWINGS

FIGS. 5A, 5B, 5C, and 5D schematically illustrate a method for installing a grille insert between a front-end grille and a front-end frame structure of a motor vehicle, according to an embodiment of the invention.

DETAILED DESCRIPTION OF EMBODIMENTS

Figure 1A:
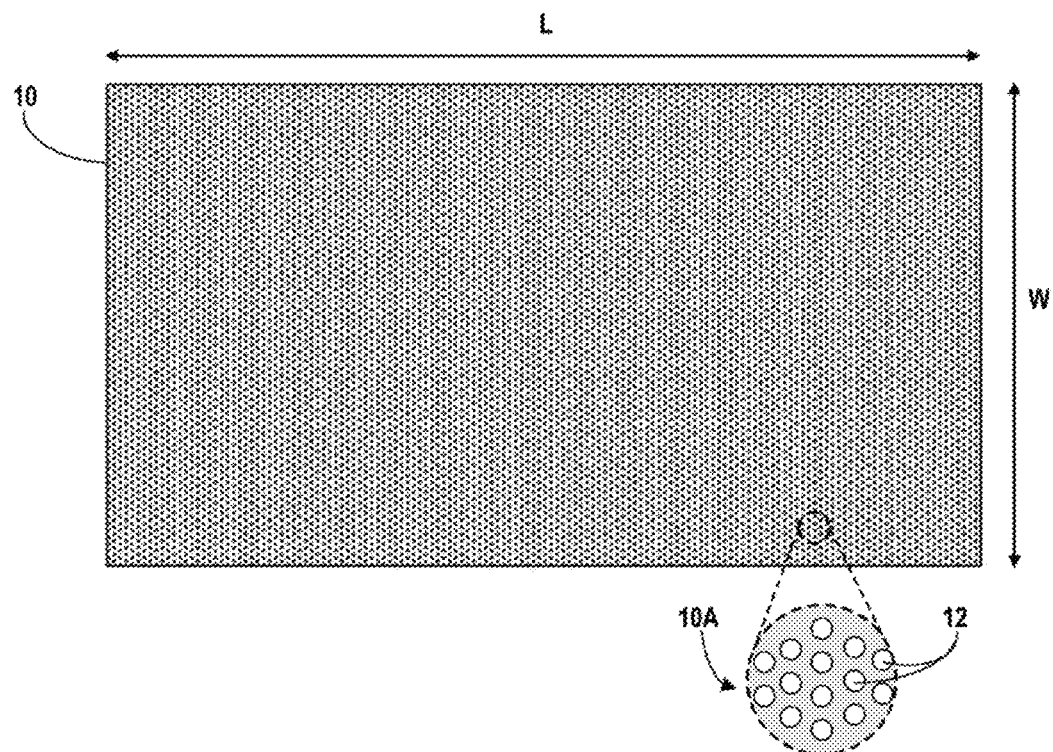
FIG. 1A illustrates a grille insert according to an embodiment of the invention.

Embodiments of the invention will now be described in further detail with reference to grille inserts and methods for installing grille inserts which are configured to protect air-cooled radiators of motor vehicles, as schematically illustrated in the drawings. It is to be understood that the same or similar reference numbers are used throughout the drawings to denote the same or similar features, elements, or structures, and thus, a detailed explanation of the same or similar features, elements, or structures will not be repeated for each of the drawings. It is to be further understood that the term "about" as used herein with regard to thicknesses, widths, lengths, etc., etc., is meant to denote being close or approximate to, but not exactly. For example, the term "about" as used herein implies that a small margin of error is present, such as 1% or less than the stated, amount.

Figure 1B:
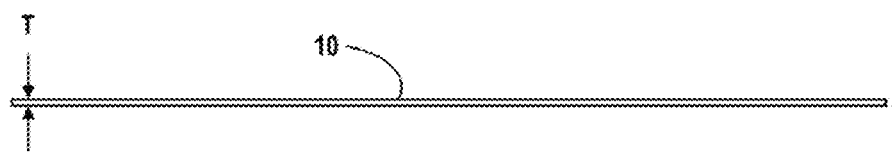
FIG. 1B is a side view of the grille insert of FIG. 1A.

FIGS. 1A and 1B schematically illustrate a grille insert according to an embodiment of the invention. In particular, FIG. 1A is a front view of a grille insert 10, and FIG. 1B is a side view of the grille insert 10 of FIG. 1A. In one embodiment of the invention, the grille insert 10 is formed from a sheet of metallic material having a pattern of perforations 12 (as illustrated in FIG. 1A by an exploded view 10A of a surface area of the grille insert 10). For example, in one embodiment, the grille insert 10 comprises a sheet of perforated aluminum having a length L and width W, as shown in FIG. 1A, and having a thickness T as shown in FIG. 1B.

The grille insert 10 is machine cut (from a larger sheet of metal) to have a footprint area (L×W) which is sufficient for the grille insert 10 to be disposed and held in place between a front-end frame structure and front-end grille of a motor vehicle (and disposed in front of an air-cooled radiator) without having to utilize fasteners or other attachment mechanisms to attach the grille insert 10 to the front-end grille, the front-end frame structure, or the air-cooled radiator. As explained in further detail below, in one example embodiment, the footprint area (L×W of the grille insert 10 is sized so that peripheral regions of the grille insert 10 overlap one or more frame members of a front-end frame structure 40 (FIG. 4A) of the motor vehicle (e.g., Jeep) to which a front-end grille 30 (FIG. 3A) is connected. This structural, arrangement/configuration allows the grille insert 10 to be snuggly held in place, and squeezed between the front-end frame structure 40 and the front-end grille 30 of the motor vehicle when the front-end grille 30 is connected to the front-end frame structure 40. For example, in one embodiment, the grille insert 10 can be cut to a dimension of about 12.5"×26.75" to fit to the front-end structure of a certain model of Jeep Wrangler (e.g., JK model).

The thickness T (or gauge) of the grille insert 10 will vary depending on the type of metal used so that the grille insert 10 is sufficiently thick to avoid damage from high-velocity debris that may impact the grille insert 10, while being sufficiently flexible/pliable to conform to uneven surfaces of the front-end frame structure 40 when the grille insert 10 is being installed and squeezed between the front-end frame structure 40 and the front-end grille 30. Moreover, the thickness T of the grille insert 10 will be limited by the amount of spacing between the front-end frame structure 40 and the front-end grille 30 in which the grille insert 10 is insertably disposed. Typically, commercially available sheet material is available in standard gauges (or thicknesses). In one embodiment, for a grille insert 10 formed of aluminum sheet metal, the thickness of the grille insert 10 can be in a range of about 0.050 of an inch to about 0.080 of an inch. In one preferred embodiment, the grille insert 10 is formed of aluminum sheet material with a thickness T of about 0.063 inches.

Furthermore, the pattern of perforations 12 should be configured to prevent passage of small debris that can impact an air-cooled radiator of the vehicle, while allowing sufficient air flow to pass through the front-end grille 30 and cool the radiator. In one embodiment, as shown in FIG. 1A, the pattern of perforations 12 comprises a pattern of holes 12. In one embodiment, each perforated hole 12 has a diameter of about ⅛ of an inch or greater. It is to be understood that other perforation patterns and/or sizes can be utilized which are useful for the given application.

Figure 2:
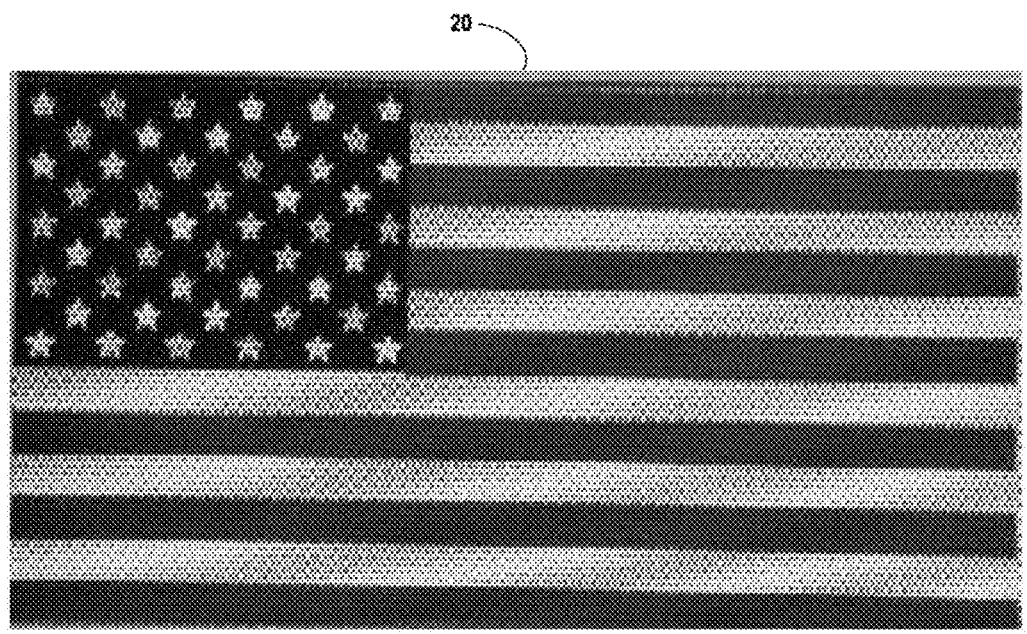
FIG. 2 shows an example of an ornamental print design that can be painted on a surface of a grille insert, according to an embodiment of the invention.

Prior to installation, one surface of the grille insert 10 can be spray painted to form a custom ornamental print design on the surface of the grille insert 10. For example, FIG. 2 shows an example of an ornamental print design that can be painted on a surface of a grille insert 20, according to an embodiment of the invention. In the example embodiment of FIG. 2, the grille insert 20 comprises an American Flag print design which is painted on the front side of the grille insert 20. The type of paint that is used to generate an ornamental print should be weather resistant and high-temperature resistant.

Figure 3A:
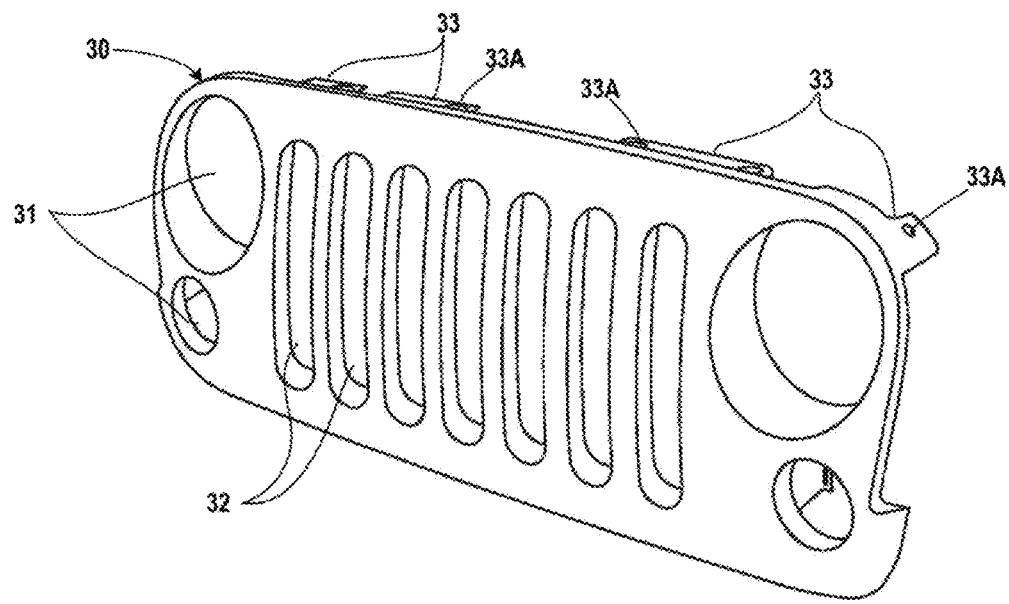
FIG. 3A is a front perspective view of a front-end grille of a motor vehicle, which can be utilized in conjunction with a grille insert according to an embodiment of the invention.
Figure 3B:
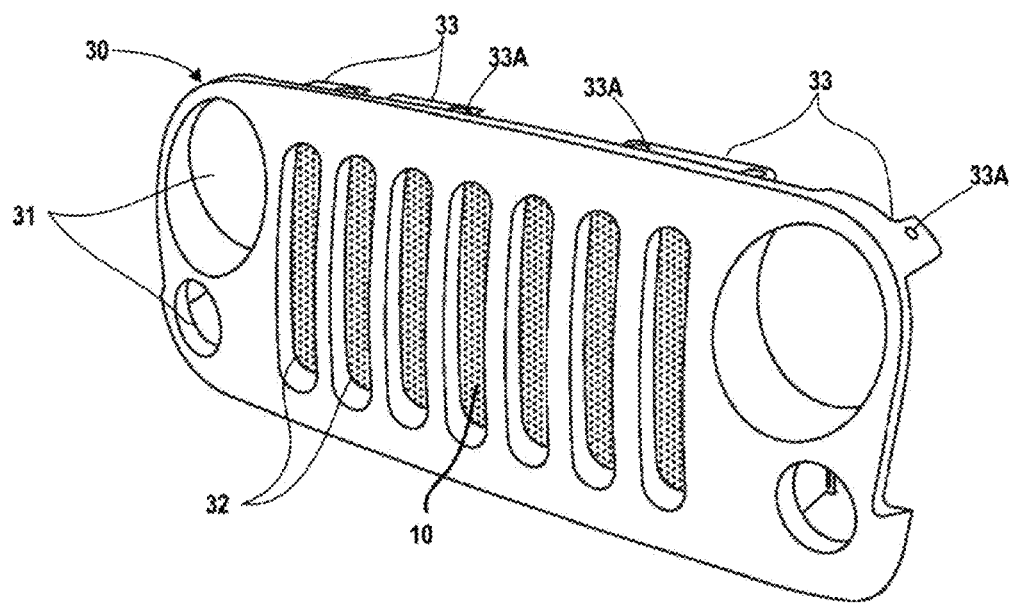
FIG. 3B is front perspective view of the front-end grille of FIG. 3A showing a grille insert disposed adjacent to a backside of the front-end grille in alignment with air intake slots, according to an embodiment of the invention
Figure 3C:
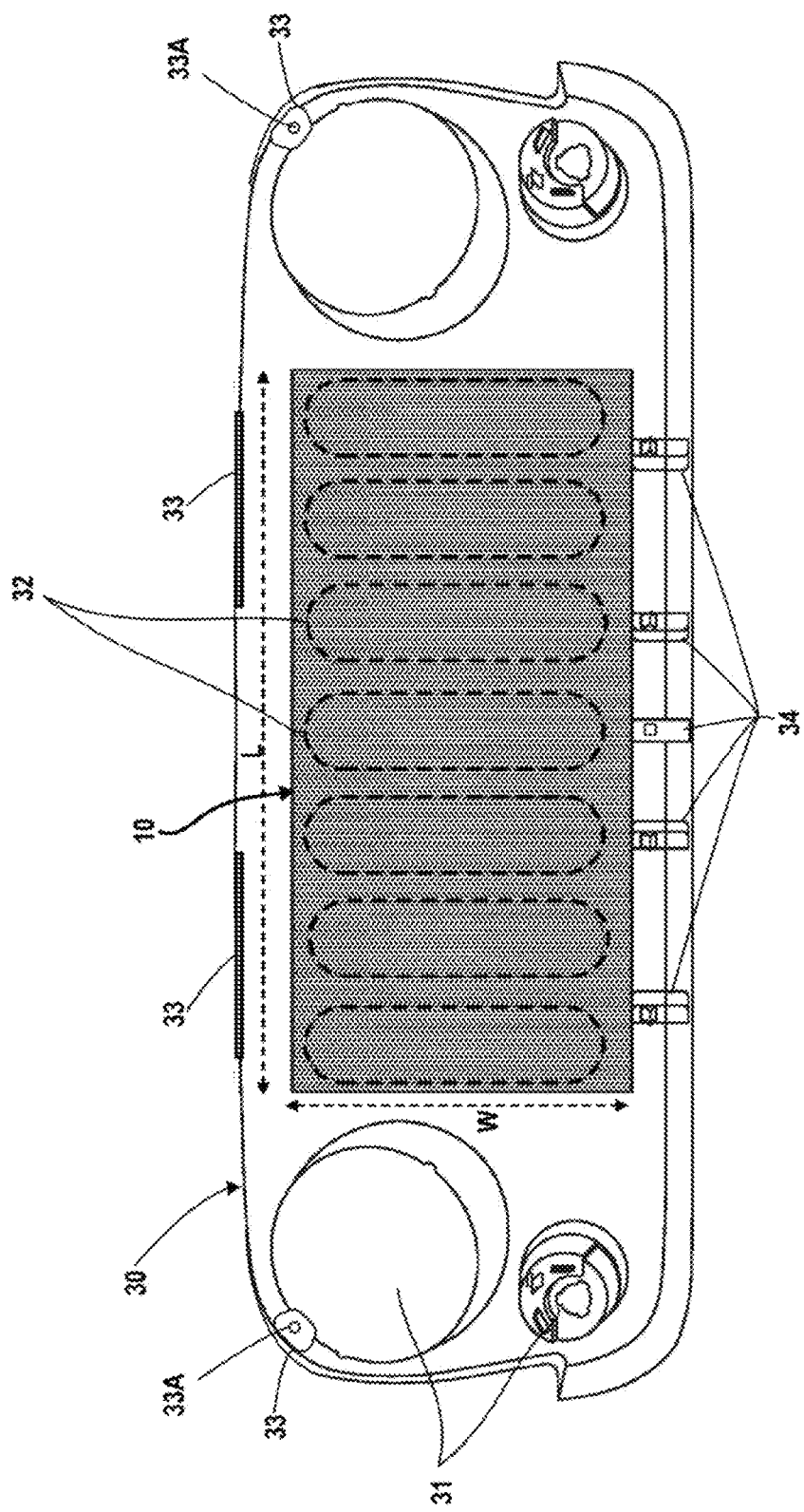
FIG. 3C is a back perspective view of the front-end grille of FIG. 3B showing the grille insert disposed adjacent to the backside of the front-end grille in alignment with the air intake slots, according to an embodiment of the invention.

FIGS. 3A, 3B, and 3C schematically illustrate a front-end grille of a motor vehicle which can, be utilized in conjunction with a grille insert, according to an embodiment of the invention. In particular, FIG. 3A is a front perspective view of a front-end grille 30, FIG. 3B is front perspective view of the front-end grille 30 of FIG. 3A showing the grille insert 10 disposed adjacent to a backside of the front-end grille 30 in alignment with air intake slots, and FIG. 3C is a back perspective view of the front-end grille 30 of FIG. 3B showing the grille insert 10 disposed adjacent to the backside of the front-end grille 30 in alignment with the air intake slots, according to an embodiment of the invention.

Referring to FIG. 3A, the front-end grille 30 comprises a plurality of openings 31 and 32 which include headlight/turn signal light openings 31 and a plurality of air intake slots 32 (or "grating structure"). In addition, a plurality of connecting tab elements 33 are disposed on a top side of the front-end grille 30, which allow the front-end grille 30 to connect to a front-end frame structure (e.g., frame 40, FIG. 4A) of a motor vehicle (e.g., Jeep Wrangler). Each connecting tab element 33 comprises an aperture 33A which insertably receives a screw or plug element to connect the top side of the front-end grille 30 to an upper portion of the front-end frame structure.

Figure 4A:
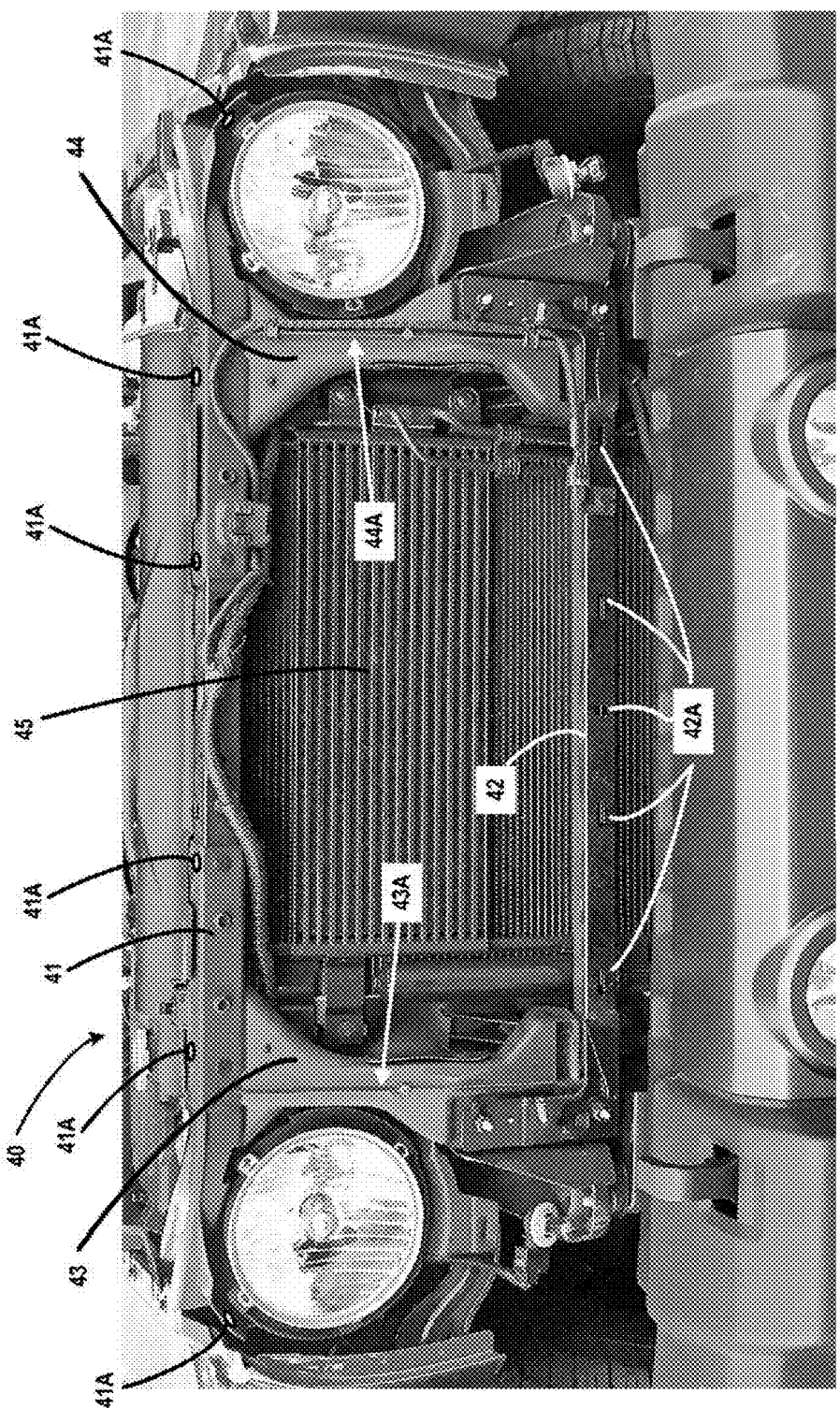
FIG. 4A schematically illustrates a front-end frame structure of a motor vehicle with the front-end grille removed.

Furthermore, FIGS. 3B and 3C show a positioning of the grille insert 10 in relation to the front-end grille 30, when the grille insert 10 is installed between the front-end grille 30 and the front-end frame structure of a motor vehicle (e.g., frame 40, FIG. 4A). As shown in FIGS. 3B and 3C, in the installed position, the grille insert 10 is aligned with, and covers, all of the air intake slots 32 of the front-end grille 30. As further shown in FIG. 3C, a plurality of connectors 34 are formed on a bottom region on the backside of the front-end grille 30. As explained below, the connectors 34 comprise plug inserts that are inserted into apertures formed on a lower portion of the front-end frame structure to fixedly connect the bottom side of the front-end grille 30 to the front-end frame structure.

FIG. 4A schematically illustrates, a front-end frame structure 40 of a motor vehicle (e.g., Jeep Wrangler) with the front-end grille 30 removed. The front-end frame structure 40 comprises an upper frame member 41, a lower frame member 42, a first side frame member 43, and a second side frame member 44. The frame members 41, 42, 43 and 44 define an opening which exposes an air-cooled radiator 45 that is positioned in a front region of the engine compartment. The upper frame member 41 comprises a series of apertures 41A (or, alternatively, threaded holes) that are aligned with corresponding ones of the apertures 33A of the connecting tabs 33 of the front-end grille 30. The lower frame member 42 comprises a series of apertures 42A that are aligned with corresponding ones of the connectors 34 on the lower backside of the front-end grille 30. The first side frame member 43 comprises an elongated raised sidewall element 43A that vertically extends along a surface of the first side frame member 43. Similarly, the second side frame member 44 comprises an elongated raised sidewall element 44A that vertically extends along a surface of the second side frame member 44.

Figure 4B:
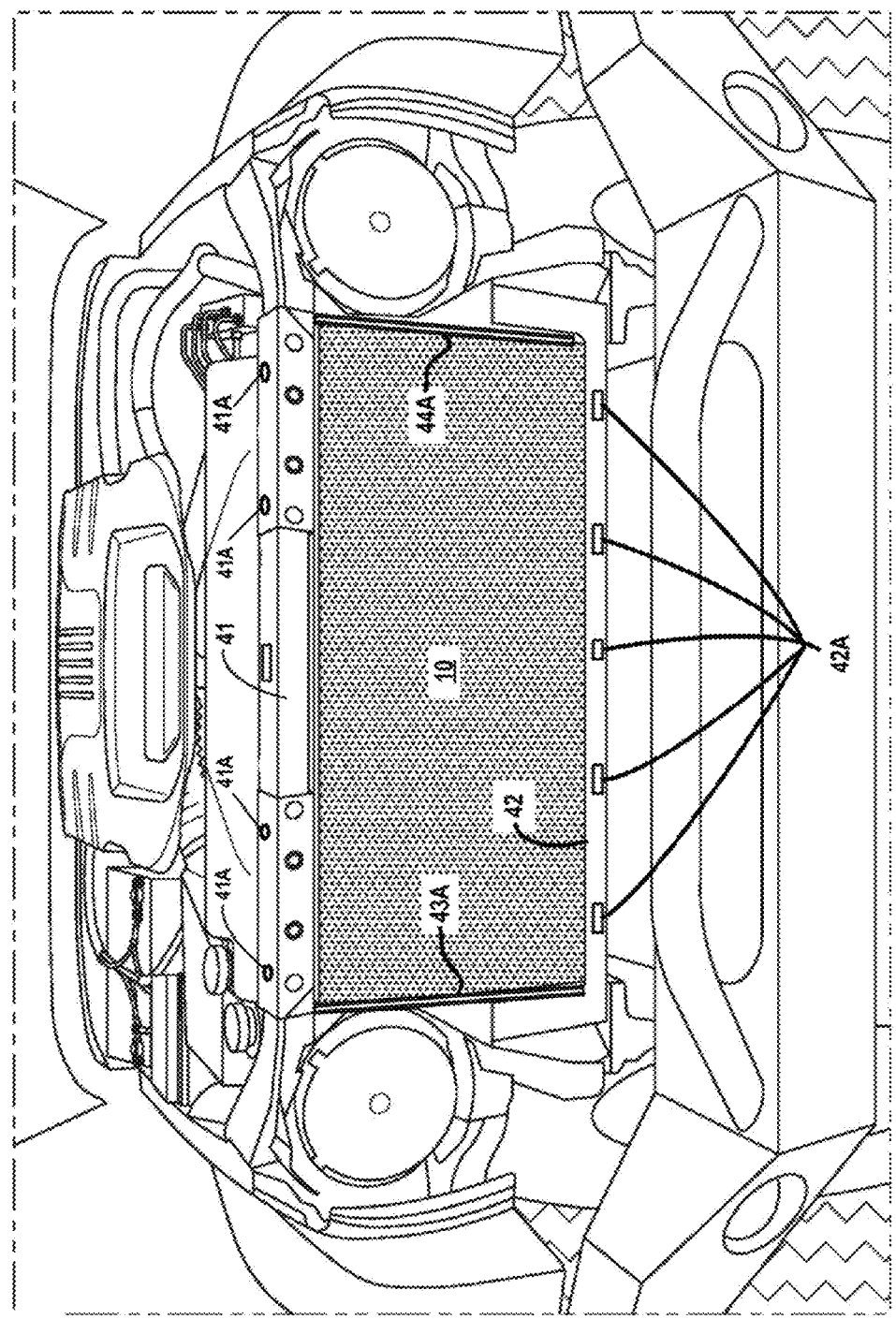
FIG. 4B schematically illustrates an installation position of a grille insert when installed between a front-end grille and the front-end frame structure of the motor vehicle of FIG. 4A, according to an embodiment of the invention.

FIG. 4B show a positioning, of the grille insert 10 in relation to the font-end frame members 41, 42, 43, and 44 when the grille insert 10 is installed between the front-end grille 30 and the front-end frame structure 40, according to an embodiment of the invention. As shown in example embodiment of FIG. 4B, in the installed position, the grille insert 10 overlaps the front side surfaces of the first and second side frame members 43 and 44, and is disposed between the raised sidewall elements 43A and 44A of the respective first and second side frame members 43 and 44.

In addition, in the example embodiment shown in FIG. 4B, a bottom edge of the grille insert 10 rests on an upper surface of the lower frame member 42 and an upper edge of the grille insert 10 is disposed below a bottom edge of the upper frame member 41. In this example embodiment, when the front-end grille 30 is connected to the front-end frame structure 40, the grille 30 exerts a force against the grille insert 10 which pushes the side edges of the grille insert 10 against the front side surfaces of the first and second side frame members 43 and 44 to securely hold the grille insert 10 in place.

In addition, the first and second raised sidewall elements 43A and 44A serve as guides during installation to place the grille insert 10 in proper position. The first and second raised sidewall elements 43A and 44A further serve to maintain a lateral position of the grille insert 10 and prevent the grille insert 10 from incrementally moving in a lateral direction over time due to vibrational forces that may be applied to the grille insert 10 and the front-end frame structure 40 when driving the motive vehicle.

FIGS. 5A, 5B, 5C, and 5D schematically illustrate a method for installing a grille insert between a front-end grille and a front-end frame structure of a motor vehicle, according to an embodiment of the invention. For illustrative purposes, an installation process according to one embodiment of the invention will be described with reference to installing a custom grille insert for a Jeep Wrangler having a front-end grille 30 and front-end frame structure 40 as described above with reference to the example embodiments shown in FIGS. 3A, 3B, 3C, 4A and 4B. However, it is to be appreciated that the same or similar grille insert devices and installation methods as described herein can be extended to other types of vehicles based on the teachings described herein.

FIG. 5A illustrates an initial step of the installation process which comprises removing a series of fasteners 35 (e.g., plastic plugs) which fixedly connect the top portion of the front-end grille 30 to the upper frame member 41 of the front-end frame structure 40. With the front-end grille 30 installed, the fasters 35 are inserted through the apertures 33A of the connection tab elements 33 of the front-end grille 30 and into the apertures 41A on the top surface of the upper frame member 41 (FIGS. 4A and 4B). As shown in FIG. 5A, the fasteners 35 (e.g., plastic plugs) can be removed (e.g., popped-out) using a flat head screwdriver 36.

Figure 5B:
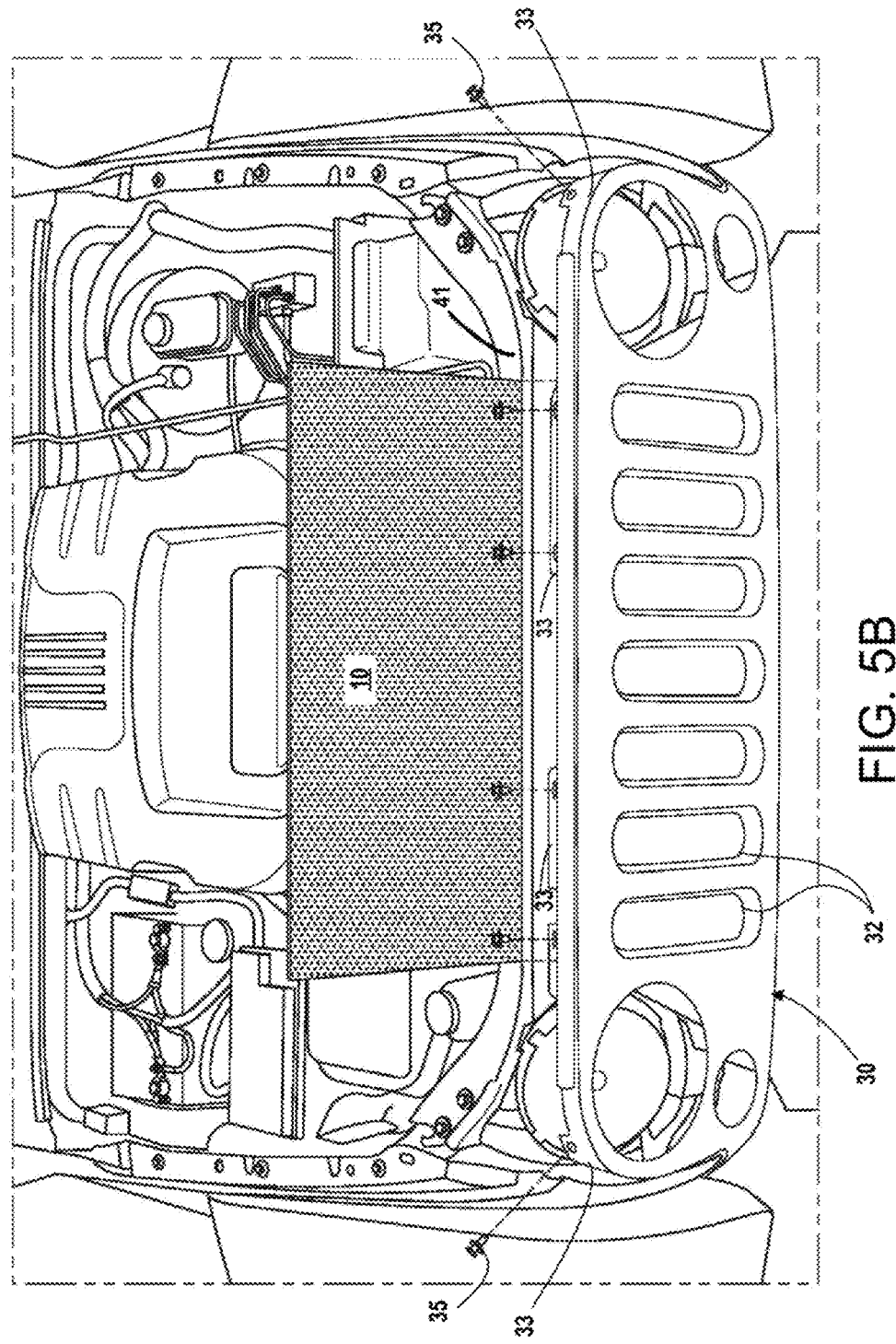
Figure 5C:
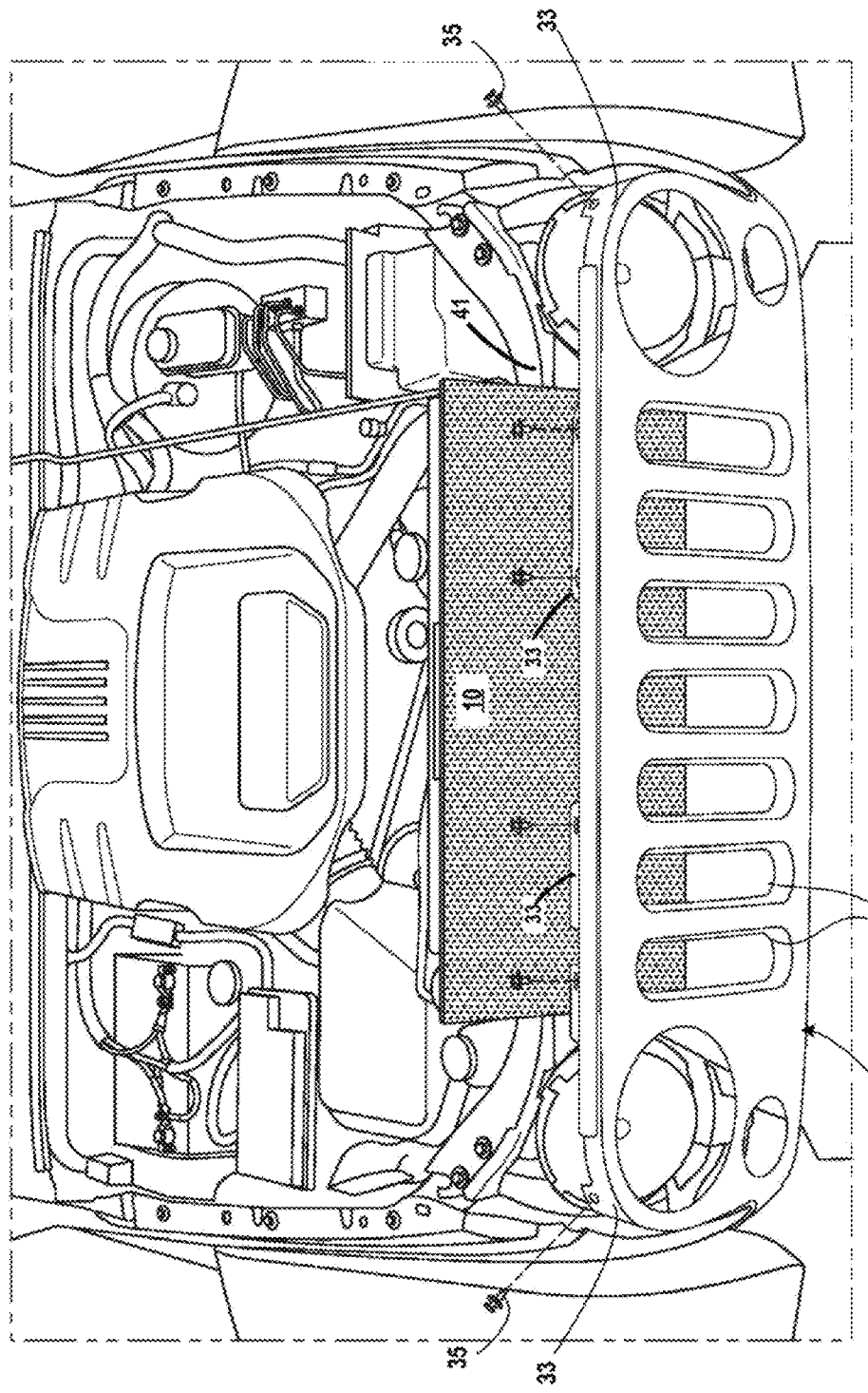

A next step in the installation process is shown in FIG. 5B. In this step, once the fasteners 35 are removed, an individual installing the grille insert 10 can use one hand to pull a top portion of the front-end grille 30 away from the upper frame member 41, and then with the other hand, hold the grille insert 10 in position so that the grille insert 10 can be slid down between the front-end frame structure 40 of the vehicle and the back side of the front-end grille 30. FIG. 5C illustrates a point in the installation process where the grille insert 10 is partially installed between the front-end grille 30 and the front-end frame structure 40 such that a bottom portion of the grille inset 10 is visible through the air intake slots 32 of the front-end grille 30. With the example installation process, the plug elements of the connectors 34 on the lower backside of the front-end grille 30 (FIG. 3C) remain inserted within corresponding ones of the apertures 42A on the lower frame member 42 so that the bottom portion of the front-end grille 30 remains attached to the lower frame member 42 during the installation process.

As the grille insert 10 is slid into place between the front-end frame structure 40 and the font-end grille 30, the grille insert 10 remains positioned between the elongated raised sidewall elements 43A and 44A of the first and second side frame members 43 and 44, as shown in FIG. 4B. The grille insert 10 is slid down between the front-end grille 30 and the front-end frame structure 40 until a bottom portion of the grille insert 10 contacts the upper surface of the lower frame member 41, as shown in FIG. 4B. In this final position, the grille insert 10 is aligned to the air intake slots 32 of the front-end grille 30. After the grille insert 10 is properly positioned, the individual will push the upper portion of the front-end grille 30 back into place, and reinstall the fasteners 35 to reconnect the upper portion of the front-end grille 30 to the front-end frame structure 40 of the motor vehicle.

Figure 5D:
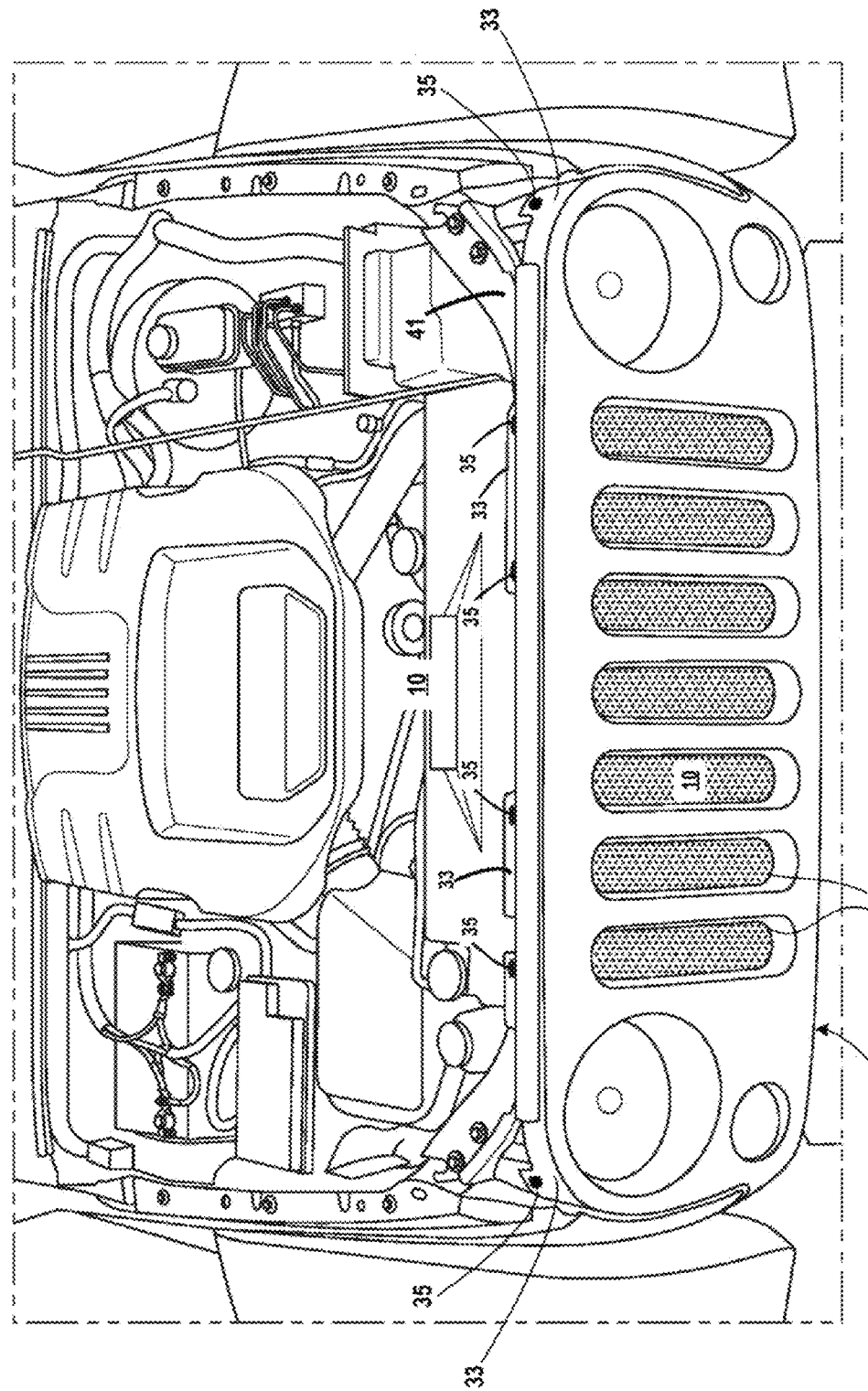

For example, FIG. 5D illustrates a final state of the installation process in which the connection tab elements 33 on the upper portion of the front-end grille 30 are reconnected to the upper frame member 41 using the fasteners 35, and where the grille insert 10 is disposed behind the front-end grille 30 with each air intake slot 32 covered by the grille insert 10. With this process, no drilling, screws, or bolts are required to physically connect the grille insert 10 to the front-end grille 30, the front-end frame structure 40 or the radiator 40, since the grille insert 10 is configured to be snuggly held in place, and squeezed between the front-end frame structure 40 and the backside of the front-end grille 30. In particular, in one example embodiment, in this structural configuration, the backside of the front-end grille 30 presses a perimeter region of the grille insert 10 against at least the first and second side frame members 43 and 44 with sufficient force to hold the grille insert 10 in position. In other structural configurations, the grille insert 10 may be dimensioned to overlap at least a portion of the front surface of the upper frame member 41 and/or the lower frame member 42 so that additional compression forces are exerted to press the upper and lower edges of the grille insert 10 against the front-end frame structure 40 to hold the grille insert 10 in place.

In the configuration shown in FIG. 5D, the grille insert 10 protects the air-cooled radiator 45 (FIG. 45) from large debris that would otherwise be able to pass through the air intake slots 32 of the front-end grille 30 and impact the radiator 45. In addition, when an ornamental design is printed on the front surface of the grille insert 10 (e.g., ornamental flag design, FIG. 2), the ornamental design will be prominently exposed and viewable through the air intake slots 32 of the front-end grille 30.

Advantageously, a grille insert according to an embodiment of the invention is made of metallic material, such as aluminum, which performs well under high heat that is generated from the engine compartment. A metallic grille insert as described herein can sustain close proximity to high temperatures and never warp, or bend which would cause damage to the grille insert, and potentially to front-end components of the motor vehicle. This is in contrast to using plastic or acrylic material for forming a grille insert, which can make the grille insert susceptible to cracking in both cold and hot temperatures.

Furthermore, a one-piece metallic grille insert design simplifies the design and installation process. Indeed, the strength of the single piece of metallic material, such as aluminum, combined with the ability to precisely cut a sheet of metallic material to form a custom grille insert with precise measurements that match those of the front-end frame structure and inside surface of the front-end grille of a given motor vehicle, advantageously allows the grille insert to be easily installed and held in place between the front-end grille and frame structure of the motor vehicle without the need for drilling or using screws or bolts, or otherwise using separate mounting frames to install the grille insert and fixedly secure the grille insert in place, as required with conventional radiator protection devices.

A grille insert according to an embodiment of the invention is configured to provide enhanced protection of an air-cooled radiator from clogging or impact damage from various types of debris that may pass through the front-end grille when driving the vehicle (especially, while "off-roading" which is commonly done with Jeep Wranglers other types of off road vehicles), while also adding style and personalization to the front end of the vehicle through the use of ornamental print designs.

Although illustrative embodiments of the present invention have been described herein with reference to the accompanying figures, it is to be understood that the invention is not limited to those precise embodiments, and that various other changes and modifications may be made therein by one skilled in the art without departing from the scope of the appended claims.

What is claimed is:

1. A system comprising:
   a grille insert comprising a planar sheet of metallic material having a series of perforations;
   a front-end frame structure of a motor vehicle; and
   a front-end grille of the motor vehicle,
   wherein the grille insert is structurally configured to slide between the front-end frame structure and the front-end grille and be held in position between the front-end grille and the front-end frame structure without use of any attachment mechanism.

2. The system of claim 1, wherein the planar sheet of metallic material comprises aluminum.

3. The system of claim 1, wherein the perforations comprise a pattern of holes, wherein the holes have a diameter of at least ⅛ inch.

4. The system of claim 1, wherein the planar sheet of metallic material comprises a thickness in a range of about 0.050 of an inch to about 0.080 of an inch.

5. The system of claim 1, further comprising an ornamental print formed on at least one surface of the grille insert.

6. The system of claim 1, wherein the grille insert comprises length and height dimensions so that the grille insert has a footprint area which is greater than an area of an opening which exposes an air-cooled radiator through the front-end frame structure of the motor vehicle, wherein the area of said opening is defined by upper, lower and side frame members of said front-end frame structure.

7. A method for installing a grille insert, comprising:
   disconnecting an upper portion of a front-end grille from a front-end frame structure of a motor vehicle;
   pulling the upper portion of the front-end grille away from the front-end frame structure of the motor vehicle;
   slidably inserting a metallic grille insert between the front-end grille and the front-end frame structure of the motor vehicle; and
   reconnecting the upper portion of the front-end grille to the front-end frame structure of the motor vehicle such that the metallic grille insert is squeezably held in position between the front-end grille and the front-end frame structure of the motor vehicle without use of any attachment mechanism.

8. The method of claim 7, wherein the metallic grille insert comprises a planar sheet of aluminum material having a series of perforations.

9. The method of claim 8, wherein the perforations comprise a pattern of holes, wherein the holes have a diameter of at least ⅛ inch.

10. The method of claim 8, wherein the planar sheet of metallic material comprises a thickness in a range of about 0.050 of an inch to about 0.080 of an inch.

11. The method of claim 7, wherein the metallic grille insert comprises an ornamental print formed on at least one surface of the grille insert, wherein the metallic grille insert is installed so that the ornamental print is viewable through a grating structure of the front-end grille.

12. The method of claim 7, wherein the front-end frame structure of the motor vehicle comprises an upper frame member, a lower frame member, a first side frame member, and a second side frame member, which define an opening which exposes an air-cooled radiator of the motor vehicle, wherein the metallic grille insert is squeezably held in position between the front-end grille and at least the first and second side frame members of the front-end frame structure.

* * * * *